United States Patent
Dudkowski et al.

(10) Patent No.: US 9,106,580 B2
(45) Date of Patent: Aug. 11, 2015

(54) METHOD OF SUPPORTING POWER CONTROL IN A COMMUNICATION NETWORK

(75) Inventors: Dominique Dudkowski, Heidelberg (DE); Peer Hasselmeyer, Frankfurt (DE)

(73) Assignee: NEC EUROPE LTD., Heidelberg (DE)

( * ) Notice: Subject to any disclaimer, the term of this patent is extended or adjusted under 35 U.S.C. 154(b) by 658 days.

(21) Appl. No.: 13/395,485

(22) PCT Filed: Jul. 8, 2010

(86) PCT No.: PCT/EP2010/004185
§ 371 (c)(1),
(2), (4) Date: Mar. 12, 2012

(87) PCT Pub. No.: WO2012/003847
PCT Pub. Date: Jan. 12, 2012

(65) Prior Publication Data
US 2012/0170592 A1    Jul. 5, 2012

(51) Int. Cl.
H04L 12/12 (2006.01)
H04L 12/717 (2013.01)
H04W 52/02 (2009.01)
H04L 12/24 (2006.01)

(52) U.S. Cl.
CPC ............... *H04L 45/42* (2013.01); *H04L 12/12* (2013.01); *H04W 52/0225* (2013.01); *H04L 41/0833* (2013.01)

(58) Field of Classification Search
None
See application file for complete search history.

(56) References Cited

U.S. PATENT DOCUMENTS 4,635,195 A   1/1987   Jeppesen et al.
4,677,566 A   6/1987   Whittaker et al.
(Continued)

FOREIGN PATENT DOCUMENTS

JP   2003324447 A   11/2003
JP   2009086697 A   4/2009

OTHER PUBLICATIONS

International Search Report dated Mar. 24, 2011, corresponding to PCT/EP2010/004185.
(Continued)

*Primary Examiner* — Hassan Phillips
*Assistant Examiner* — Duc Duong
(74) *Attorney, Agent, or Firm* — Young & Thompson (57) ABSTRACT

A method of supporting power control in a communication network, the network including a plurality of network elements (1) that perform packet forwarding, wherein each network element (1) includes one or more ports—element ports (2)—, is characterized in the steps of assigning a flow table (4) to each of the network elements (1), wherein the flow table (4) includes flow entries (5) that specify via which element ports (2) to forward packets the network element (1) receives, deriving target sets from the flow tables (4), wherein a target set characterizes either a network element (1) as a whole—element target set—or an individual element port (2)—port target set—in terms of its utilization, and based on changes in the respective target sets, deciding on the enforcement of power states on the network elements (1) and/or the element ports (2).

24 Claims, 6 Drawing Sheets

(56) References Cited

U.S. PATENT DOCUMENTS

| | | | |
|---|---|---|---|
| 7,535,841 B1* | 5/2009 | Beshai et al. | 370/230.1 |
| 8,098,658 B1* | 1/2012 | Ranganathan et al. | 370/389 |
| 8,438,249 B2* | 5/2013 | Urano et al. | 709/220 |
| 2003/0202477 A1 | 10/2003 | Zhen et al. | |
| 2004/0163000 A1 | 8/2004 | Kuhlmann et al. | |
| 2009/0003229 A1* | 1/2009 | Loh et al. | 370/252 |
| 2009/0274070 A1 | 11/2009 | Mukherjee et al. | |
| 2010/0115082 A1* | 5/2010 | Pirozzi | 709/224 |
| 2010/0157830 A1 | 6/2010 | Yazaki et al. | |
| 2011/0051602 A1* | 3/2011 | Matthews et al. | 370/235 |
| 2011/0307718 A1* | 12/2011 | Aybay et al. | 713/310 |
| 2012/0120958 A1* | 5/2012 | Mahadevan et al. | 370/392 |
| 2014/0286301 A1* | 9/2014 | Werb et al. | 370/330 |

OTHER PUBLICATIONS

Kin-Hon Ho, et al.; "Green distributed routing protocol for sleep coordination in wired core networks"; Networked Computing (Inc), May 11, 2010, pp. 1-6.

Erol Gelenbe, et al.; "Reducing power consumption in wired networks"; Computer and Information Sciences; Sep. 14, 2009; pp. 292-297.

Antonio Cianfrani, et al.; "An Energy Saving Routing Algorithm for a Green OSPF Protocol"; INFOCOM IEE Conference on Computer Communications Workshops; Mar. 15, 2010; pp. 1-5.

* cited by examiner

Fig. 6 ated into the network processor of a network element (e.g. a SOHO router), which adapts the power consumption of multiple processing elements of that network processor depending on monitored utilization of each processing element and also based on interdependencies between processing elements of the same network processor. US2009/0274070 A1 describes methods to optimize power management of end and network devices attached to a communication network.

METHOD OF SUPPORTING POWER CONTROL IN A COMMUNICATION NETWORK

BACKGROUND OF THE INVENTION

1. Field of the Invention

The present invention relates to a method of supporting power control in a communication network, said network including a plurality of network elements that perform packet forwarding, wherein each network element includes one or more ports—element ports—.

2. Description of the Related Art

In order to reduce global CO2 emissions incurred by the operation of information and communication technology (ICT), energy management of ICT infrastructures has become one of society's key objectives. In particular, reducing the energy consumption of communication networks, e.g. data centers or core networks, which may be composed of a large number of network elements, such as network switches and network routers, has become an important partial objective within the ICT scope.

On one hand, energy saving strategies deal with questions of how to forward traffic in such a way that the network elements are optimally utilized in terms of energy consumption. For example, increasing the traffic flow on a highly loaded network element is generally more suitable, since it will more likely lead to the situation where network elements that are only lightly loaded can be relieved of all traffic flow eventually. On the other hand, and usually subsequent to the calculations of the energy saving strategies, power control mechanisms act on the network elements by shutting them down and starting them up without impacting the network's functioning. Which network elements to shut down and which ones to start up is often decided separately from the energy saving strategies and requires a consistent analysis of the network state such that only those network elements are shut down that are definitely known to be not in use.

This problem shows to be very difficult because communication networks are generally characterized by complex traffic flows and dynamic interactions between peers connected to the network. As a result, the network elements' state relevant for performing packet forwarding and routing decisions may change frequently. This leads to the particular situation that a network element cannot be shut down solely based on an analysis of its own state, but the state of adjacent network elements must also be considered. Additional complexity is introduced by the fact that power state transitions may incur a certain amount of time, and during the process of starting up, packets that cannot be forwarded via a transiting network element need to be handled in a suitable way.

Apart from energy saving strategies that focus on the optimization of the utilization of network elements, e.g. the ones described in M. Baldi, Y. Ofek: "Time for a "Greener" Internet.", in Proceedings of the IEEE International Conference on Communications Workshops, 2009, or in PCT/EP 2010/002219 (not yet published), state of the art related to power control does not provide an effective solution on how to decide consistently and uniformly which network elements must be turned on or off in exactly which situations.

On the one hand, relatively simple methods enable to shut down and start up individual network elements (e.g. described in the White Paper: "Wake on LAN Technology.", Lieberman Software Corporation, Rev 2—Jun. 1, 2006, or in White Paper: "Magic Packet Technology. Advanced Micro Devices.", Publication #20213, Rev: A, Amendment/0. Issue Date: November 1995). More specifically, U.S. Pat. No. 4,677,566 and U.S. Pat. No. 4,635,195 provide a centralized power control logic system that maintains a consistent view of the power state of a set of connected network elements and allow to control the power state of each connected element by turning it on or off. These contributions do, however, not consider the larger network context each network element may be part of. In summary, the above mentioned approaches can be regarded as enabling technologies that may be used by the method proposed by the present invention.

On the other hand, some power management methods also consider interactions between processing elements of the same network element (e.g. described in US 2004/0163000 A1) or a network element's wider context (e.g. described in US2009/0274070 A1), but do not define concrete methods that consistently perform power control of all the network elements in a communication network. More specifically, US 2004/0163000 A1 describes a state machine that is incorporated into the network processor of a network element (e.g. a SOHO router), which adapts the power consumption of multiple processing elements of that network processor depending on monitored utilization of each processing element and also based on interdependencies between processing elements of the same network processor. US2009/0274070 A1 describes methods to optimize power management of end and network devices attached to a communication network.

BRIEF SUMMARY OF THE INVENTION

It is therefore an object of the present invention to improve and further develop a method of the initially described type of supporting power control in a communication network in such a way that an optimized utilization of network elements becomes readily possible, while at the same time the overall energy savings in the communication network shall be highly effective.

In accordance with the invention, the aforementioned object is accomplished by a method comprising the features of claim 1. According to this claim, such a method is characterized in the steps of assigning a flow table to each of said network elements, wherein said flow table includes flow entries that specify via which element ports to forward packets the network element receives, deriving target sets from said flow tables, wherein a target set characterizes either a network element as a whole—element target set—or an individual element port—port target set—in terms of its utilization, and based on changes in the respective target sets, deciding on the enforcement of power states on said network elements and/or said element ports.

While intuitively, a freed network element can be turned off and when required must be turned on again, according to the invention it has been recognized that controlling a network element's power state in a uniform and consistent way often shows to be very difficult. This is because in networks where switching and routing is used to forward packets, a network element's state may change frequently and may also depend on the state of adjacent network elements. Furthermore, changing the power state of a network element may involve temporal overhead that needs to be considered, and care must be taken to handle data packets in an appropriate way while network elements are in the process of starting up.

According to the present invention the power state of network elements in a communication network is controlled based on the notion of so-called target sets and their management. Target sets characterize each network element and its individual element ports by a set based on which it is possible to quickly decide whether the network element and each of the element ports must be turned on or off. As a result, the method according to the present invention provides a comprehensive practical basis (target sets and their management) to characterize whether a network element and also an element's port must be turned on or off with minor impact (only delays) on packet forwarding. In contrast to prior art approaches, the present invention considers multiple interconnected network elements on the granularity of both the elements and their individual ports. This means that a network-wide power management approach is taken by considering a wider context of each network element that is beyond the individual element's view.

Transitional delays between power states (e.g. startup and shutdown durations) can be parameterized arbitrarily, for instance, individually for every single network element, which does not influence the functioning of the methods. Moreover, the method according to the present invention is applicable to any kind of energy model that may be used for a network element, for instance, elements where the power consumption of individual ports is negligible, in which case the target set of the complete network element can be used to control only the complete network element.

Target sets, as defined by the present invention, are used to characterize both a network element as a whole and individual element ports in terms of their utilization, and they are derived from flow entries. According to a specific embodiment the target set of a single element port P of a network element S may be defined, informally, as the union of the following two subsets of flow entries:

1) All flow entries of network element S that have a forwarding rule whose egress port points to element port P. That egress port can be either the concrete port number P or an aggregation that includes port P, such as "all egress ports" or "all ports but the port via which the packet was received".

2) All flow entries of network element T, which is connected to network element S's port P via T's port Q, each flow entry having as egress port Q or an aggregation that includes port Q, such as "all egress ports" or "all ports but the port via which the packet was received".

The union of the two subsets in 1) and 2) may then be defined to constitute the "port target set" for element port P and together with the changes in this target set determines when an element port is in use and when an element port can be turned on or off.

In analogy to the port target set, extending the above concept to a whole network element, all individual port target sets of element ports $P_1, P_2, \ldots, P_n$ of a network element S may be unified in an "element target set" for the whole network element S.

Based on the definition of target sets as describe above it may be provided that an element port is deactivated in case the corresponding port target set becomes empty and/or that a network element is deactivated in case the corresponding element target set becomes empty. In other words, if an element target set is nonempty, the associated network element must remain operational, otherwise, it can be turned off because the network element does not have any flow entries pointing to it (neither from the network element itself, nor from any other network element that is connected to it).

According to a specific embodiment a centralized power control may be provided that, upon relevant changes of a port target set and/or an element target set, initiates the activation/deactivation of the corresponding element port and/or network element. This means that a centralized power control approach leaves all control actions to a controller and works in a centralized way. That is, upon the relevant changes of port or element target sets, the controller initiates the shut down and start up of the corresponding element port and network element, respectively.

In case of a centralized power control approach it may further be provided that the centralized power control calculates a routing path, identifies network elements on the routing path, and stores a local copy of the flow tables of each of the network elements. Moreover, the centralized power control may calculate changes in the flow tables that need to be applied to establish the routing path, and select those network elements and element ports for which the element target set and port target set, respectively, have become non-empty. After having done so, the centralized power control may contact each selected network element and element port to initiate start up. As a result, an efficient adding of flow entries is realized, which requires only those network elements that are actually involved in packet forwarding along the routing path to become activated.

In contrast to the starting up of an element port, starting up a network element generally takes a significant amount of time. This means that a packet that has been intercepted by a network element may have to be forwarded via intermediary network elements that are not yet operational. The trivial solution is to simply drop the packet and all subsequent packets that match the same flow entry until all required network elements are operational. This solution is undesirable, since it may involve a large number of packets being dropped and especially for users in the Internet may result in suboptimal experience.

In order to avoid excessive packet droppings, which would result in a declined user experience, it may be provided that a packet intercepted by a network element on its routing path towards a destination node is buffered by that network element until it receives a signaling message from the centralized power control indicating that all network elements of the routing path have become activated.

As an alternative to a purely centralized power control, in which a centralized controller node is in charge of the entire control including the respective signaling, a power control approach could be deployed according to which at least some of the functionality is embedded in the network elements. For instance, in such case it may be provided that a first network element at which a packet, which is to be transmitted within the network, is intercepted buffers that packet and asks the centralized controller to find an appropriate routing path through the network. In a next step the first network element may contact all network elements on the routing path, communicating routing table entries to them. After that, the first element may wait for incoming notifications about all network elements on the routing path being operational, and it may then release the buffered packet into the network. Element target sets and/or port target sets may be updated by the network elements on the routing path individually according to the routing information received from the first network element.

The main benefits of embedded power control are twofold: First, it does not require replicating information about each network element's flow table at the controller node for the purpose of power control, but the network elements manage their state alone to accomplish power management. That is, the decentralized, embedded model allows autonomous power management without the involvement of an external party. Secondly, it takes advantage of the fact that timing out of flow entries is already a local action that is autonomously occurring in the network and suggests embedded handling in the first place. Hence, both reduction of the communication between network elements and controller node and the reduction of computations at the controller node can significantly improve overall management efficiency.

The decentralized, embedded method can be deployed in existing networks without affecting its regular function. It is even possible to mix network elements supporting power management and those not supporting power management. By providing both centralized and embedded methods for power control, an application in many types of network infrastructures is possible, depending on the support in network elements. It is even possible to mix features of centralized and embedded methods, which would be appropriate in heterogeneous infrastructures. For instance, in a specific embodiment it may be provided that methods of centralized and embedded power control are combined into a hybrid method such that one network segment is controlled by the embedded methods, while another segment, which may not support the embedding of management functions, is controlled centrally.

The removal of flow entries is of particular interest in the embedded case because a significant amount of messages to the controller node can be omitted. According to a preferred embodiment it may be provided that a network element, in case a flow entry is removed from its flow table, adjusts its port target set and element target set, determines the set of adjacent network elements whose target sets are affected by the removed flow entry, and signals to all affected adjacent elements the removed flow entry. Based on the received information, all network elements are enabled to adapt their own element target sets and port target sets autonomously and to initiate appropriate shut-down procedures, if possible.

Generally, it may be provided that flow entries are removed from flow tables implicitly by the definition of flow entry timeouts. Alternatively, flow entries may be removed from flow tables upon explicit request from the centralized power control.

In principle, the shutting down of affected element ports and network elements can be executed with immediate effect. For an element port, this makes sense virtually always, because any overhead involved in port shutdown (e.g. deactivation of those parts of the element's electronics that are responsible for packet transmission and reception) can be assumed to be negligible in modern network switches and network routers. Whenever the port is required again, it can also be started up virtually immediately. For a complete network element, this situation is different because overhead in both temporal and energy terms is significant. To economize the network element's state changes it may be provided that, in case of a network element deactivation, an explicit idling period is introduced that has to elapse before the network element's deactivation procedure is finally initiated. If any flow entry is created in the meantime that leads to the creation of an element target set of the considered network element, that idling period may be reset and the network element may be considered in use again. Realizing the idling timeout can be done at the controller node or within the respective network element directly, if supported.

In case a port or switch is to be switched off and there are still packets queued on that port or switch, a local policy about how to proceed is consulted. Packets could simply be dropped and the shut-down action could be enforced immediately. Alternatively, the port/switch could just be tagged for shutdown and will only be switched off when the respective queue(s) have been emptied. The advantage is that packet drop is avoided and the efficiency of the network is sustained.

According to another embodiment, instead of buffering packets during delayed switch startup, it may be provided that the delay incurred by the starting up of a relevant network element is signaled back to the requester, which then repeats the request when the delay has elapsed.

Purely centralized power control as described above bears the problem that it involves significant communication overhead between network elements and the controller node. The following example illustrates the possible magnitude of overhead: Assume a network with 1000 network elements, each possessing a fairly sized flow table that leads to 1 flow entry timeout per second. In the whole network, this leads to 1000 signaling messages that the controller node will receive so that it can re-determine target sets. This is a significant overhead that can easily result in a bottleneck, especially because it is unlikely that the timeouts occur evenly distributed, but likely highly accumulated during some periods.

In order to improve this situation, according to another preferred embodiment, it may be provided that the centralized power control duplicates or mimics network element state changes relevant to element target sets and/or port target sets. The centralized power control, based on information about hard flow entry timeouts, may then remove flow entries from its local copy of network elements' flow tables at the end of the entries' lifetimes. Network elements do the same on their copy ensuring both copies to be equal. Accordingly, there is no need to explicitly signal flow entry removal due to hard timeouts from network elements to the controller node.

On the other hand, soft timeouts do need to be signaled, but their forwarding can be optimized. The respective solution that will be described in the following exploits the fact that many relevant events are independent of network traffic and can be mimicked by the controller node without network interaction. It is based on an optimization of the occurrence of traffic-dependent events by synchronization both among one another and also with traffic-independent events. The relevant actions that may occur in conjunction with a flow entry are the following:

Adding of flow entry by controller node: this action requires the explicit interaction between the controller node and the network element, but no additional signaling.

Explicit removal of flow entry by controller node: again, explicit interaction is required for this action and no additional signaling. As stated previously, this action should occur rather rarely, otherwise, a bottleneck will form.

Removal of flow entry by hard timeout: because a hard timeout is a fixed constant that is known to the controller node, the behavior of flow entry removal based on hard timeouts can easily be mimicked by the controller node. Therefore, no signaling is required for this traffic-independent action.

Removal of flow table entry by soft timeout: in contrast to hard timeouts, soft timeouts are traffic-dependent because they are reinitialized with every packet that is forward according to the flow entry the timeout is associated with. Signaling is required, but can be optimized as described below.

It is likely that soft timeouts dominate the types of timeouts, since they are the most reactive ones due to their dependency on traffic. However, due to their traffic-dependency, they cannot be mimicked easily at the controller node, for which the controller node would need to monitor traffic at every network element.

With respect to an optimization of the signaling of soft timeouts to the controller node it may be provided that soft flow entry timeouts of different flow entries of a flow table are synchronized with each other by introducing a soft timeout clock cycle. Additionally, it may be provided that hard timeouts are synchronized with soft timeouts by making the hard timeout interval a multiple of the soft timeout clock cycle.

Generally, each selected network element and element port may be contacted by a control message from the centralized controller node to initiate start up. In the situation where a network element is on and only an element port is to be started up, this can be achieved for example via SNMP (Simple Network Management Protocol). In the situation where a network element is currently turned off and requires startup, signaling can be achieved by using for example Wake-On-LAN technology via special packets. Therefore, each network element may be equipped with such Wake-on-LAN capabilities, preferable on each port (e.g. via a "magic" packet).

According to a specific application scenario, the methods as describe above may be applied to network routers that make use of routing tables containing routing entries, which decide on how to forward data packets. In this embodiment, routing entries correspond to flow entries, and routing tables correspond to flow tables. Target sets and target set management is then performed based on the routing entries of network routers. Alternatively or additionally, the methods may be applied to network switches that make use of switching tables containing switching entries, which decide on how to forward data packets. In this embodiment, switching entries correspond to flow entries, and switching tables correspond to flow tables. Target sets and target set management is then performed based on the switching entries of network switches. The switches may be, for instance, OpenFlow switches, where flow tables and flow table entries are used to define and manage the target sets of OpenFlow switches and their ports. In particular, it is possible to apply the proposed methods to networks that are composed of heterogeneous network elements, such as network routers and network switches. It is possible to extend the definition of target sets in such a way that it can capture both routing and switching information consistently, because the semantics of that information is similar.

BRIEF DESCRIPTION OF THE DRAWINGS

There are several ways how to design and further develop the teaching of the present invention in an advantageous way. To this end, it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawings:

DETAILED DESCRIPTION OF THE PREFERRED EMBODIMENTS

Figure 1:
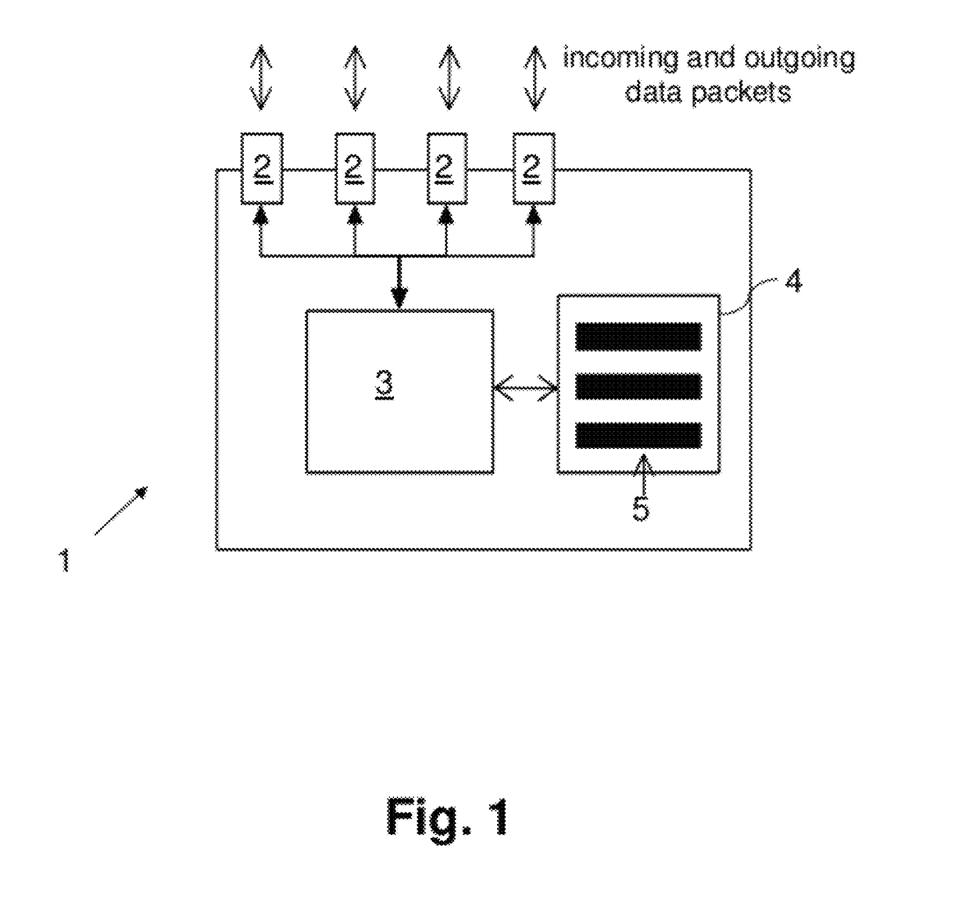
FIG. 1 is a schematic view of a network element as employed according to an embodiment of the present invention.

In the following descriptions, as already mentioned above, the general terms "network element" and "element port" are used to refer to any kind of network element that performs packet forwarding, for example, a network router or a network switch. FIG. 1 schematically depicts a network element 1 as employed according to an embodiment of the present invention. For instance, network element 1 may be a network switch or a network router.

The illustrated network element 1 includes a total of four element ports 2 via which incoming/outgoing packets can be received/transmitted by the network element 1. Internally, the element ports 2 are connected to an element processor 3 that is in charge of the entire element control. In the network element 1, a "flow table" 4 is assumed that contains "flow entries" 5 (three of which are exemplarily indicated in FIG. 1) that decide how to forward packets that the network element 1 receives. A flow entry 5 generally defines a mapping between physical element ports, but can also involve virtual ports such as "all ports but the port via which the packet was received" or "queue i on port j".

1. Target Sets

An important prerequisite to the definition of power control algorithms and the execution of power control actions is the knowledge about whether and when a specific network element can be turned off without compromising network functions. For example, it is intuitively clear that a network element involved in forwarding packets that belong to a certain traffic flow cannot be turned off while doing so. On the other hand, a network element should be turned on just at the right time when it is required for packet forwarding, while taking into consideration the latency for the network element start-up process.

In the following, the conditions are described under which a particular network element will be turned on and off based on the concept of target sets. Target sets are used to characterize both a network element as a whole and individual element ports in terms of utilization and are derived from flow entries. Consider the target set of a single element port P of a network element S first, which is defined, informally, as the union of the following two subsets of flow entries:

1) All flow entries of network element S that have a forwarding rule whose egress port points to element port P. That egress port can be either the concrete port number P or an aggregation that includes port P, such as "all egress ports" or "all ports but the port via which the packet was received".

2) All flow entries of network element T, which is connected to network element S's port P via T's port Q, each flow entry having as egress port Q or an aggregation that includes port Q, such as "all egress ports" or "all ports but the port via which the packet was received".

The union of the two subsets in 1) and 2) is the "port target set" for element port P and together with the changes in this target set determines when an element port is in use and when an element port must be turned on or off. When the port target set is nonempty, at least one element in the set (that is, a flow entry) points to port P either directly (at network element S) or indirectly (at some adjacent network element T) and the port might be in use for packet forwarding. If the port target set is empty, element port P is not the egress or ingress port for any packet and can be deactivated. The relevant changes in a port target set are, therefore, the creation of a port target set for an element port (or, the adding of the first element to an empty port target set) that indicates that an element port must be turned on, and the emptying of a port target set (or, the removal of the last element from a nonempty port target set), which indicates that an element port can be turned off.

The previously described scheme holds for single element ports of a network element and can be extended to the whole network element as follows. For that, all individual port target sets of element ports $P_1, P_2, \ldots, P_n$ of a network element S are unified in an "element target set" for the whole network element S. In analogy to the port target set, if the element target set is nonempty, the network element must remain operational, otherwise, it can be turned off because the network element does not have any flow entries pointing to it (neither from the network element itself, nor from any other network element that is connected to it).

Figure 2:
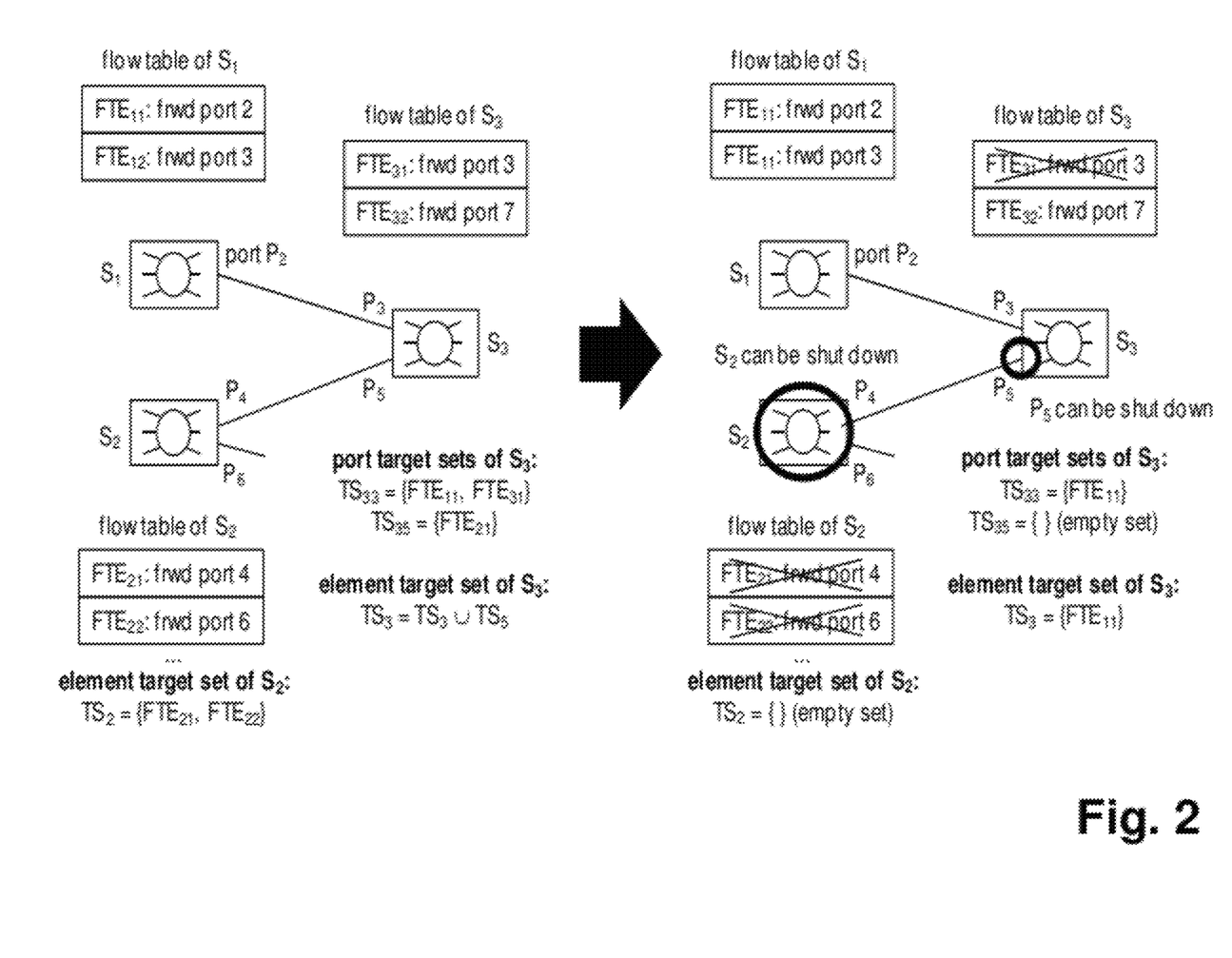
FIG. 2 is a schematic view generally illustrating the concept of element target sets and port target sets as employed according to an embodiment according to the present invention.

Both port target sets and element target sets are schematically illustrated in FIG. 2. In FIG. 2, a number of flow entries are removed at network elements $S_2$ and $S_3$. As a result, the port target sets of $S_3$ and the element target sets of both $S_2$ and $S_3$ change. Because the element target set of $S_2$ is now empty, that network element can be shut down. For network element $S_3$, only the port target set $TS_{35}$ has become empty, and element port $P_5$ can be shut down. The case where flow entries are added works analogously.

According to an even more sophisticated embodiment, the definition of element target sets and port target sets may also consider the possibility that these target sets can be constructed by cooperation also beyond the adjacent network elements of the considered network element (that is, to neighbors of neighbors of the network element in question). In another embodiment, the definition of port target sets and element target sets can be influenced also by additional external triggers, e.g. in order to start up a switch even if no flow entries are pointing to it. In still another embodiment, the notion of port target sets and element target sets can also be applied to higher levels of aggregations, such as target sets that capture a network segment that is composed of several network elements.

2. Power Control Methods

In the following, two methods for power control based on port and element target sets according to the definition described above will be explained in some more detail. The first solution, "centralized power control", assumes that a controller node performs all control actions on network elements. In the second solution, "embedded power control", control actions are, at least partly, performed within the network by cooperation between network elements. The first solution does not require specific functionality of network elements. The second solution requires additional computing support in the network elements.

2.1. Centralized Power Control

Centralized power control leaves all control actions to the controller and works in a centralized way. That is, upon the relevant changes of port target sets or element target sets, the controller initiates the shut down and start up of the corresponding port and element, respectively.

2.1.1. Adding of Flow Entries

Figure 3:
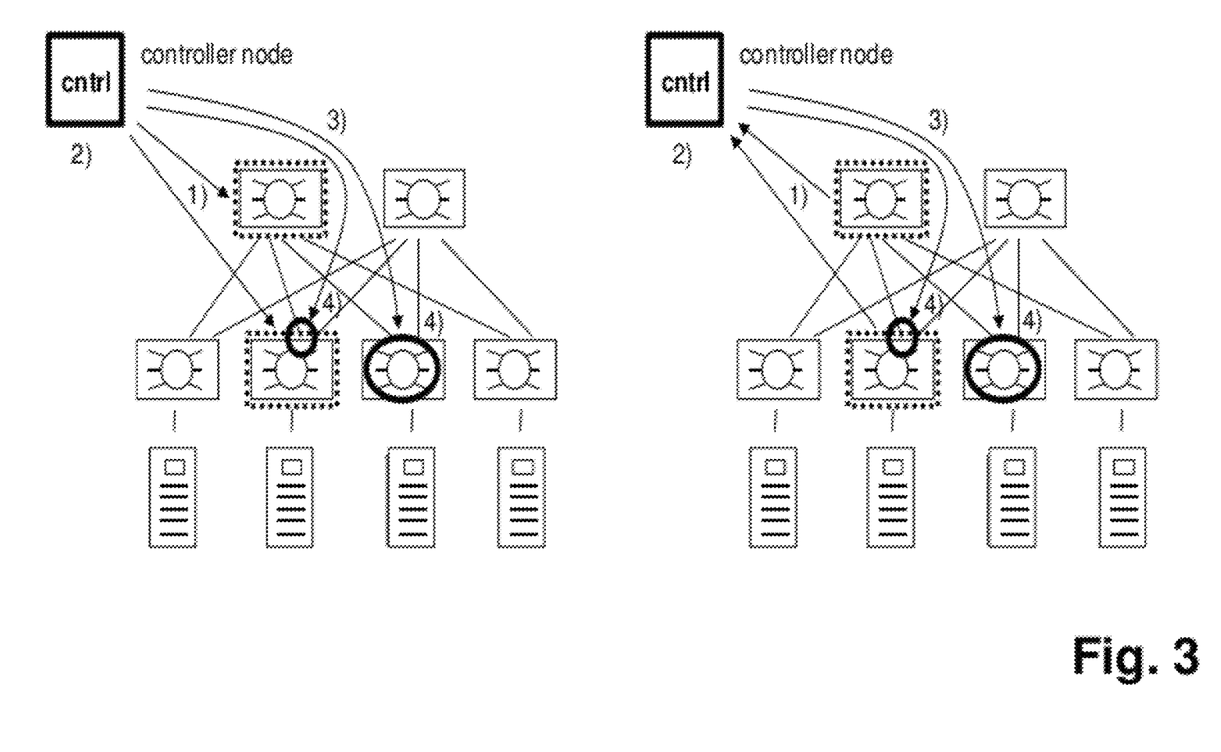
FIG. 3 is a schematic view illustrating the adding of flow entries (left) and the removal of flow entries (right) with a centralized power control according to an embodiment of the present invention.

Adding of flow entries in connection with a centralized power control is illustrated in the left part of FIG. 3. According to the illustrated embodiment the following sequence of steps will be executed:

1) The controller node calculates a new path through a network which applies to a stream of packets (a "flow"). The network elements on that path are identified.

2) The controller node stores a local copy of each network element's flow table and calculates the changes that need to be applied in order to establish the previously selected route through the network. It applies the calculated changes to the local copy of the flow table and then recalculates both port and element target sets that might be affected according to the target set definitions in Section 2. The set of network elements that are affected are the ones that were just augmented by an additional flow entry, and those adjacent network elements that are pointed to by any network element's new flow entry. Based on the performed calculations, those network elements and element ports are selected for which the element target set and port target set, respectively, have now become nonempty.

3) Each selected network element and element port is contacted by a control message from the controller node to initiate start up. In the situation where a network element is on and only an element port is to be started up, this can be achieved for example via SNMP. In the situation where a network element is currently turned off and requires startup, signaling can be achieved by using for example Wake-On-LAN technology via special packets (as described, for instance, in the two White Papers named in the introduction).

4) As soon as all network elements and element ports are started up, the controller node adds flow entries for the new flow at the subset of network elements that are involved in forwarding packets via that flow.

Switching on network elements can happen in in-band or out-of-band fashions. In the out-of-band case all network elements possess a direct link to the controller node and they can be switched on directly and in parallel. In the in-band case start-up messages are sent to network elements via the regular data links and are therefore subject to the same routing and power-savings mechanisms as regular packets. It can therefore happen that contacting certain network elements requires switching on other elements beforehand. The controller node therefore calculates a plan for sequentially switching on elements based on the power states of elements and element connectivity, in case direct reachability is not given.

2.1.2. Delayed Network Element Startup and Packet Buffering

In contrast to the starting up of an element port, starting up a network element generally takes a significant amount of time. This means that a packet that has been intercepted by a network element may have to be forwarded via intermediary network elements that are not yet operational. The trivial solution is to simply drop the packet and all subsequent packets that match the same flow entry until all required network elements are operational. This solution is undesirable, since it may involve a large number of packets being dropped and especially for users in the Internet may result in suboptimal experience.

Instead, according to the embodiment described in the following in connection with FIG. 4, a packet is buffered until all relevant network elements become available again. This solution is transparent in functional terms but only involves a delay in the response to the request that is being buffered. Since in most cases the buffered packet corresponds to an initial request of a client application (e.g. the request to start streaming a video), only a single delay is introduced until the flow is firmly established, which is often acceptable (and often also indistinguishable from other possible causes for delay) by a client.

Figure 4:
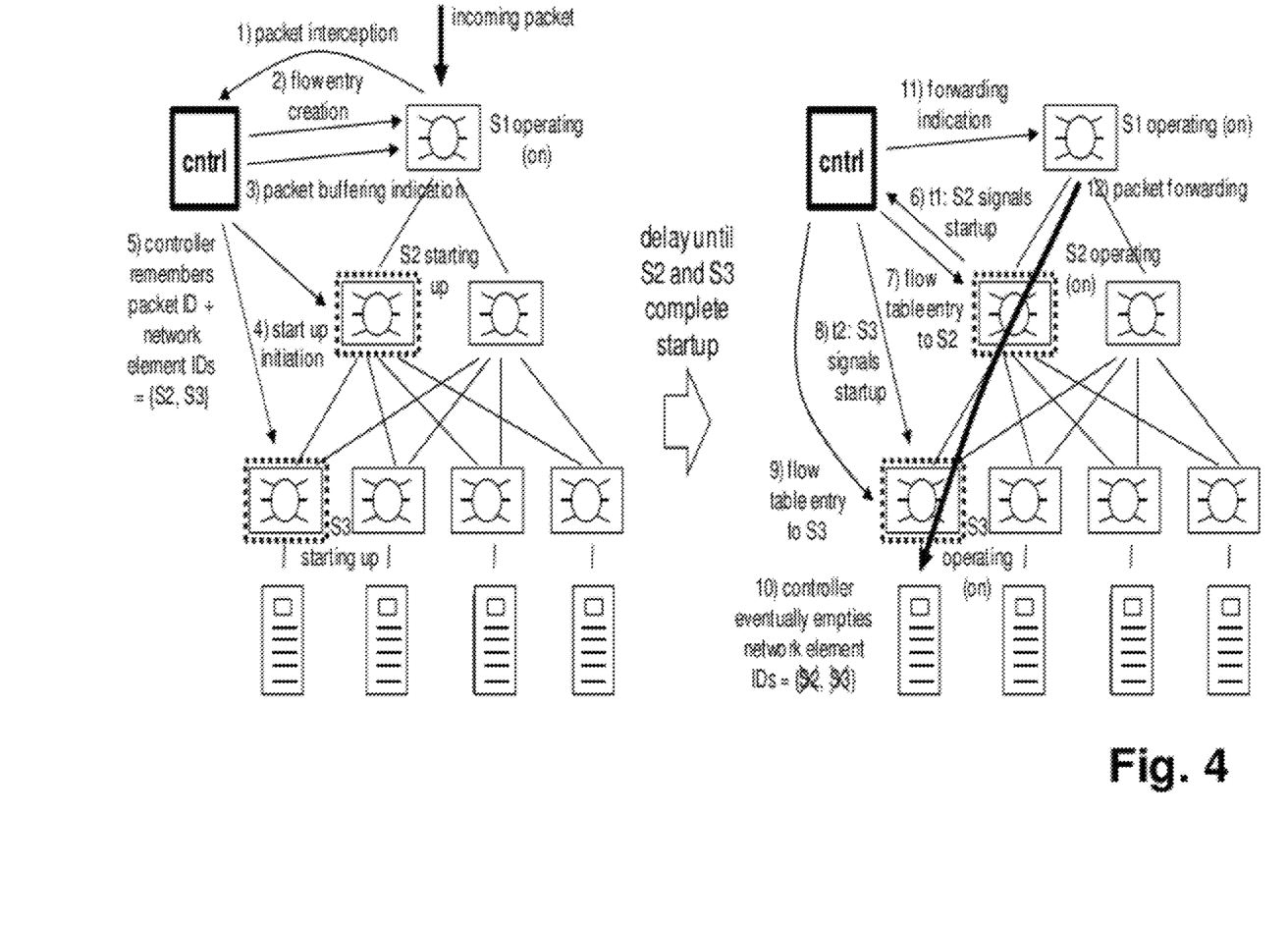
FIG. 4 is a schematic view illustrating a delayed network element startup and packet buffering with a centralized power control according to an embodiment of the present invention.

The delayed network element startup and packet buffering method works according to the following steps, illustrated in FIG. 4:

1) The packet is intercepted by the controller node and processed in such a way that a destination end node that is connected to the network is selected and also a network path to that end node. For that, any load balancing and path calculation engines can be used, e.g. the ones described in PCT/EP 2010/002219 (not yet published). In FIG. 4, the selected path is via network elements S1, S2, and S3.

2) From the flow entries to be created, those are enforced that belong to network elements that are currently operational (on). Network elements that are currently off cannot be communicated with for flow entry creation. In FIG. 4, only S1 is operational.

3) To the network element at which the packet was intercepted, the controller node indicates to buffer the packet until further notice from the controller node. The network element in turn puts the relevant packet in a local buffer.

4) For all network elements that are currently off, the controller node signals to these elements that they need to turn on. This can be accomplished, for instance, by Wake-on-LAN technology as noted before. Those network elements that are already in the process of starting up (which is possible due to a previous flow creation process) may be omitted.

5) During the time the affected network elements are starting up, the controller also holds a record with a suitable packet ID (e.g. the packet's sequence number) and the network element that buffers the packet. Furthermore, IDs (e.g. IP addresses) of the network elements that are pending startup are stored in that record as well.

The right side of FIG. 4 shows the situation where network elements S2 and S3 are completing their startup procedure, with the following steps occurring:

6) At t1, network element S2 completes its startup process and becomes operational, which it signals to the controller node.

7) The controller node removes S2 from the set of network elements pending startup for the buffered packet entry and transmits the flow entry to be created to S2.

8) At t2, network element S3 becomes operational and signals to the controller node.

9) The controller node removes S3 from the set of network elements pending startup and transmits S3's flow entry.

10) At this time, the controller node detects that the set of pending network elements is empty, indicating that the path of the flow is complete.

11) The controller node now sends a forwarding indication to indicate to the buffering network element that the packet currently buffered can be released into the network.

12) At this time, all flow entries exist in network elements S1, S2, and S3 and the packet can be forwarded to its destination.

2.1.3. Removal of Flow Entries

The removal of flow entries can occur either implicitly by flow entry timeouts or by explicit request of the controller node. Flow entry timeouts can further be distinguished into soft and hard timeouts, where the first depends on the most recent use time of the respective entry and the last is a firm timeout that occurs after a fixed period from the installation of the flow entry. In any case, expiration of an entry triggers re-calculation of both port and element target sets. The process of flow entry removal after a (soft or hard) timeout of a flow table entry has occurred is illustrated in FIG. 3 on the right side. In practice, such timeouts can be expected to occur much more frequently than the proactive removal of a flow table entry by the controller node.

1) A hard timeout occurs at a network element and the flow entry is removed.

2) Entry removal is signaled to the controller node, which updates the change in its local storage. If the controller node removes an entry proactively, this step is not applicable. The controller node then recalculates both port and element target sets that might be affected by the removed flow entry. Based on the performed calculations, those elements and ports are selected for which the element and port target set now contain no more entries.

3) In the most rigorous case, each selected network element and element port is contacted by a control message (e.g. via SNMP) from the controller node to initiate shut down.

4) Network elements and element ports are powered down. While a port's powering down becomes effective instantaneously, the powering down of a network element may be a transition involving time, depending on whether the network element requires consistent shutdown or can be turned off immediately (the former case being the more likely one).

2.2. Centralized Power Control with Mimic Function

As already mentioned above, centralized power control proves to be disadvantageous in that it involves significant communication overhead between network elements and the controller node.

According to an embodiment of the present invention, in order to reduce the communication overhead, a method can be applied according to which the controller node duplicates, or mimics, network element state changes relevant to port and element target sets without interacting with the involved elements. The controller node knows about hard timeouts at network elements. It can use that information to remove flow entries from its local copy of network elements' flow tables at the end of the entries' lifetimes. Network elements do the same on their copy ensuring both copies to be equal. Accordingly, there is no need to explicitly signal flow entry removal due to hard timeouts from network elements to the controller node. Soft timeouts do need to be signaled, but their forwarding can be optimized as described below. The key ideas of this part of the invention are 1) to exploit the fact that many relevant events are independent of network traffic and can be mimicked by the controller node without network interaction, and 2) to optimize the occurrence of traffic-dependent events by synchronization both among one another and also with traffic-independent events.

2.2.1. Synchronization of Soft Timeouts Among One Another

In the usual approach, a soft timeout is a time interval $dt_{soft\text{-}timeout}$ that expires if a flow entry has not been used for $dt_{soft\text{-}timeout}$. If a packet is forwarded at current time $T_{current}$, hence, the next soft timeout is scheduled for $T_{current} + dt_{soft\text{-}timeout}$.

Figure 5:
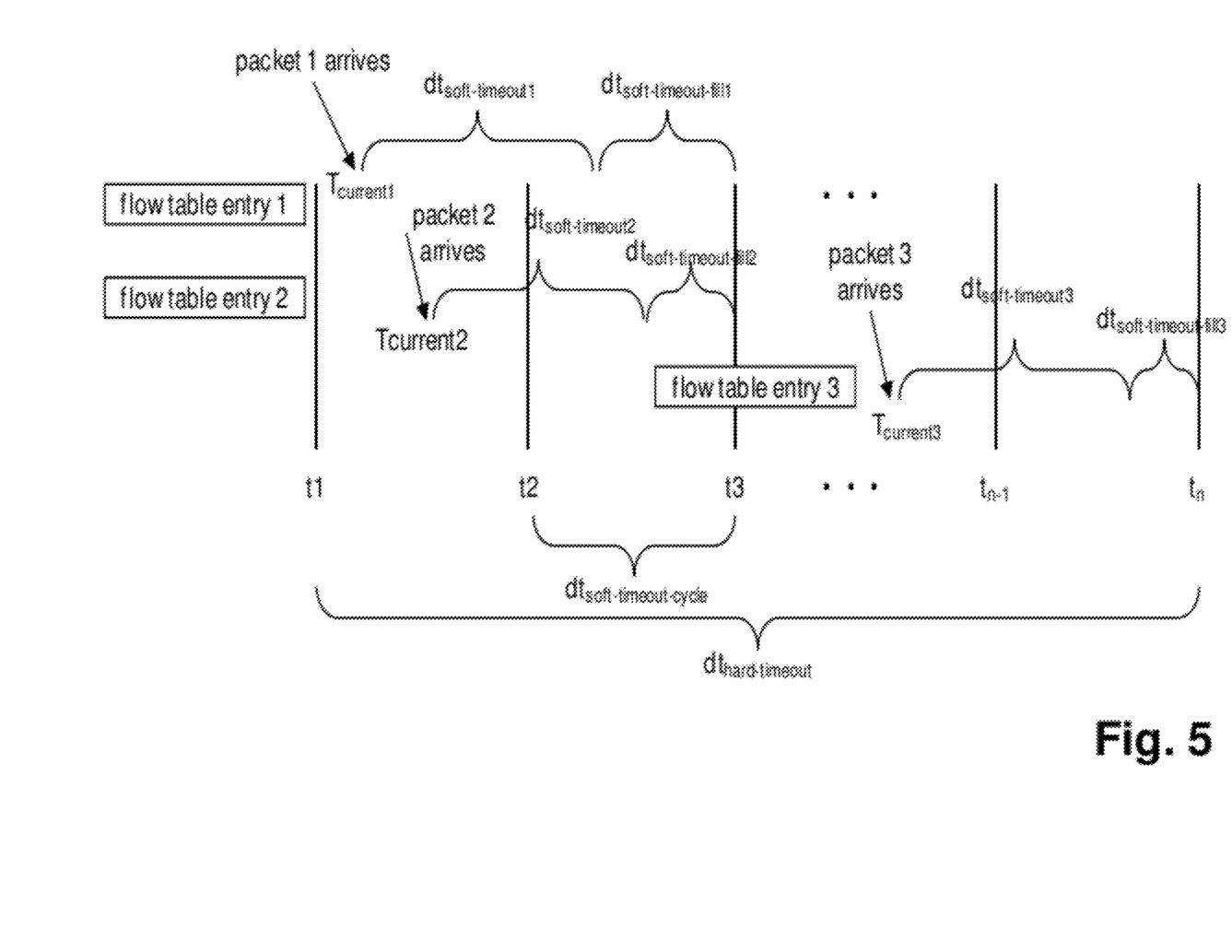
FIG. 5 is a schematic view illustrating the synchronization between soft timeouts and hard timeouts of flow entries according to an embodiment of the present invention.

According to an embodiment of the present invention clocked soft timeouts are used, where a soft timeout clock interval $dt_{soft\text{-}timeout\text{-}cycle}$ is introduced and soft timeouts are clocked accordingly. Then, a packet that is switched at $T_{current}$ leads to the scheduling of the next soft timeout for the corresponding flow table entry at $T_{current} + dt_{soft\text{-}timeout} + dt_{soft\text{-}timeout\text{-}fill}$. FIG. 5 illustrates several examples of this type of synchronization. In particular, it is to be noted that the non-clocked soft timeouts of different flow entries do not have to be of the same length.

All flow table entries that are expiring at the same time $n^* dt_{soft\text{-}timeout\text{-}cycle}$ are signaled to the controller together in a single message. The batching of the entry removal notifications reduces the communications traffic between the network elements and their controllers as multiple individual messages are now signaled together in a single message.

2.2.2. Synchronization of Soft Timeouts and Hard Timeouts

In the usual approach, soft timeouts and hard timeouts occur independently from one another. According to a specific embodiment of the present invention a further optimization of the occurrence of soft timeouts is achieved by synchronizing them in a way that is more likely to coincide with the occurrence of hard timeouts. This can be supported by making the hard timeout $dt_{hard\text{-}timeout}$ interval a multiple of the soft timeout clock cycle, that is, $dt_{hard\text{-}timeout} = n \cdot dt_{soft\text{-}timeout\text{-}cycle}$.

Using this kind of synchronization leads to soft timeouts that coincide with hard timeouts that need not be signaled separately to the controller node since the hard timeout is known to the controller and correctly reflected in the controller's flow table copies.

In FIG. 5 an example is shown where a soft timeout $dt_{soft\text{-}timeout3}$ is clocked and synchronized with hard timeouts such that it coincides with a hard timeout. It is to be noted that it is not necessary to synchronize hard timeouts among one another, because they are traffic-independent and can be mimicked by the controller node.

The following example uses values of the previous example and illustrates the effectiveness of timeout synchronization. It is assumed $dt_{hard\text{-}timeout} = 60$ s, $dt_{soft\text{-}timeout} = 7$ s, $dt_{soft\text{-}timeout\text{-}cycle} = 10$ s. As before, it is further assumed that 1000 soft timeouts occur every second in the whole network. Synchronization leads to 167 timeouts occurring in sync in the mean, and in particular, to 167 timeouts that are in sync with the hard timeout. Assuming that the events generated by timeouts can be fully aggregated in the network prior to their signaling to the controller node, only 5 aggregate messages need to be sent to the controller node. This approach therefore requires the network to support such aggregation functionality in order to exploit the full potential of the synchronization method.

2.3. Embedded Power Control

Centralized power control either without or with mimic function requires the interaction between network elements and the controller node. In particular, the controller node always needs to send explicit shut down messages to the network elements in order to shut them down.

According to an embodiment of the present invention the management of port target sets and element target sets is distributed by embedding this function into the network elements themselves. Similar to the aggregation function applied in Section 2.2.2, embedding target set management requires additional computational support at the network elements (e.g. switches).

In the following, three basic assumptions are made about the enabling technologies required to allow the implementation of embedded power control:

- Each network element possesses Wake-on-LAN capabilities on each port (e.g. via a "magic" packet), as has been assumed previously.
- Each network element possesses local computation and storage capabilities to embed a limited set of management functionality.
- Each network element can communicate with its neighboring network elements via a simple management protocol for signaling purposes.

The principal idea and approach is to distribute target set management and trigger the turning on and off of network elements accordingly.

2.3.1. Adding of Flow Entries

Adding new flow entries is initiated by a controller node as described in Section 2.1.1. Modification of power control with centralized coordination is required with respect to the approach according to which packets are buffered in a network element while network elements needed for forwarding the packet are starting up.

According to an embodiment of the present invention the functionality performed by the controller node regarding packet buffering and element startup is moved to the first network element at which the packet was intercepted. In the embodiments described previously these functions were split between controller node and network element.

As before, the first network element buffers the incoming packet and asks the controller to find an appropriate route through the network. The initial network element then contacts all network elements on the path, communicating routing table entries to them. Elements that are switched off are first turned on by exploiting the Wake-on-LAN capability. The initial element waits for incoming notifications about all the elements being operational and it then releases the buffered packet into the network as described in Section 2.1.2, so that it can be delivered to its final destination. Target sets are updated by the individual network elements according to the routing information received from the initial network element.

2.3.2. Removal of Flow Entries

Figure 6:
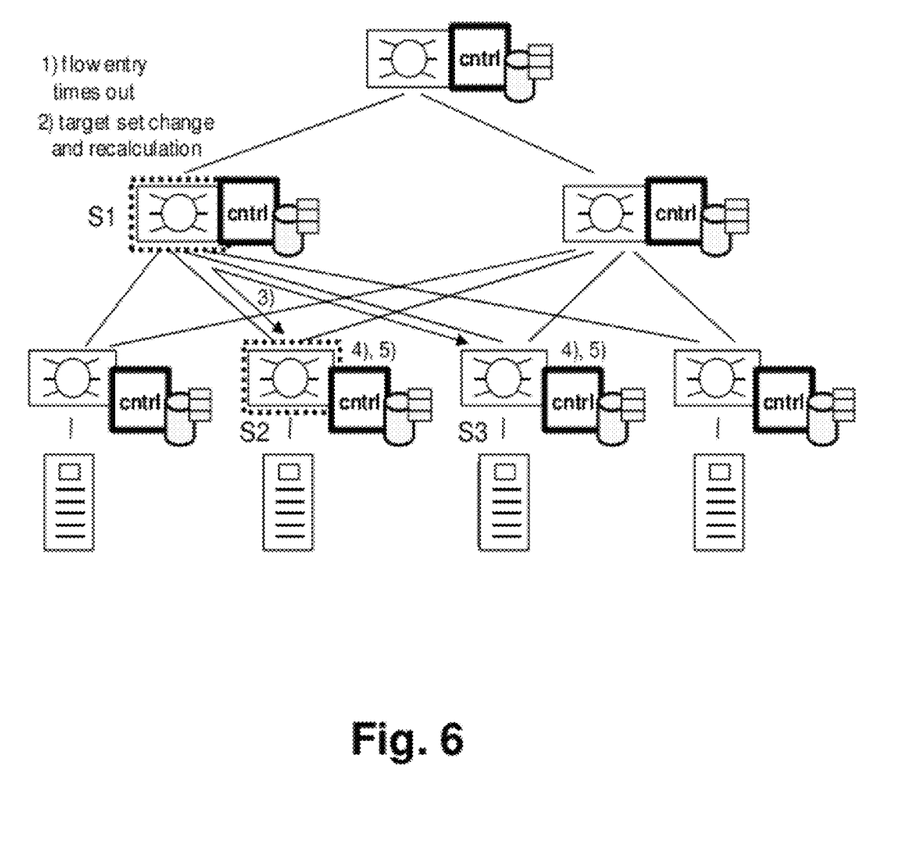
FIG. 6 is a schematic view illustrating the timeout and removal of flow entries with an embedded power control according to an embodiment of the present invention.

The removal of flow entries is of particular interest in the embedded case because a significant amount of messages to the controller node can be omitted. The removal of a flow entry that occurs due to a hard or soft timeout is shown in detail in FIG. 6, with the following steps being executed:

1) A timeout occurs at a network element and the flow entry is removed.

2) The network element adjusts the local port and switch target set based on the removed flow entry. The network element then determines the set of adjacent network elements whose target sets are affected by the removed flow entry. This is done by checking the egress port of the removed entry. If it is a single port, a single adjacent network element is affected. In the case of an aggregated port, multiple adjacent elements may be affected.

3) The network element signals to all affected adjacent elements the removed flow entry.

4) All network elements adapt their own port and element target sets autonomously based on the received information.

5) At this point, all network elements whose target sets have changed have also executed these changes and can autonomously determine whether one or more ports or the network element as a whole can be shut down. For each emptied port target set, the corresponding port is shut down immediately. For each emptied element target set, the network element enters idling state and is scheduled for shutdown after a fixed idling period. When the idling period elapses, the network element finally shuts down.

Finally, it is to be noted that any part of described functions may be implemented in software, hardware, or both. This holds specifically for functions that are located at network elements.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of supporting power control in a communication network, said network including a plurality of network elements that perform packet forwarding, each network element including one or more element ports, the method comprising:
  assigning a flow table to each of said network elements, said flow table including flow entries that specify via which element ports to forward packets the network element receives;
  deriving target sets from said flow tables, each of the target sets characterizing either a network element as a whole element target set or an individual element port as a port target set in terms of its utilization; and
  based on changes in the respective target sets, determining enforcement of power states on said network elements and/or said element ports,
  wherein the target set of the element port of the network element, which is the port target set, includes all flow entries of said network element that have the element port as an egress port together with all flow entries of other network elements that are connected to the element port of the network element via an element port specified as an egress port in the flow entries.

2. The method according to claim 1, wherein the target set of the network element, which is the element target set, includes the flow entries of all element ports of said network element.

3. The method according to claim 1, wherein a centralized power control is provided that, upon relevant changes of the port target set and/or the element target set, initiates activation/deactivation of the corresponding element port and/or network element.

4. The method according to claim 3, wherein a packet intercepted by one of the network elements on its routing path towards a destination node is buffered by said network element until the network element receives a signaling message from said centralized power control indicating that all network elements of said routing path are activated.

5. The method according to claim 3, wherein a first network element, at which a packet that is to be transmitted within said network is intercepted, buffers said packet and asks said centralized controller to find an appropriate routing path through said network.

6. The method according to claim 5, wherein said first network element contacts all network elements on said routing path, communicating routing table entries to all the network elements.

7. The method according to claim 5, wherein said first element (1) waits for incoming notifications about all network elements (1) on said routing path being operational and it then releases said buffered packet into said network.

8. The method according to claim 5, wherein element target sets and/or port target sets are updated by said network elements on said routing path individually according to the routing information received from said first network element.

9. The method according to claim 3, wherein said centralized power control duplicates or mimics network element state changes relevant to the element target sets and/or the port target sets.

10. The method according to claim 9, wherein said centralized power control, based on information about hard flow entry timeouts, removes flow entries from its local copy of the flow tables of the network elements.

11. The method according to claim 1, wherein one of the network elements, when a flow entry is removed from the flow table of the one network element, adjusts its port target set and element target set, determines the set of adjacent network elements whose target sets are affected by said removed flow entry, and signals to all affected adjacent elements the removed flow entry.

12. The method according to claim 1, wherein flow entries are removed from the flow tables by the definition of flow entry timeouts.

13. The method according to claim 1, wherein flow entries are removed from the flow tables upon an explicit request from said centralized power control.

14. The method according to claim 1, wherein, when one of the network elements is deactivated, an idling period is introduced that has to elapse before a deactivation procedure of the deactivated network element is finally initiated.

15. The method according to claim 14, wherein said idling period is reset when a flow entry is created that results in the creation of an element target set for said network element.

16. The method according to claim 14, wherein said idling period is controlled by said centralized power control or within the respective network element directly.

17. The method according to claim 1, wherein soft flow entry timeouts of different flow entries of one of the flow tables are synchronized with each other by introducing a soft timeout clock cycle.

18. The method according to claim 1, wherein hard timeouts are synchronized with soft timeouts by making the hard timeout interval a multiple of said soft timeout clock cycle.

19. The method according to claim 1, wherein said network elements are equipped with Wake-on-LAN capabilities.

20. The method according to claim 1, wherein said network elements are network routers/switches that use routing/switching tables containing routing/switching entries.

21. A method of supporting power control in a communication network, said network including a plurality of network elements that perform packet forwarding, each network element including one or more element ports, the method comprising:
  assigning a flow table to each of said network elements, said flow table including flow entries that specify via which element ports to forward packets the network element receives;
  deriving target sets from said flow tables, each of the target sets characterizing either a network element as a whole element target set or an individual element port as a port target set in terms of its utilization; and
  based on changes in the respective target sets, determining enforcement of power states on said network elements and/or said element ports,
  wherein the element port is deactivated when the corresponding port target set becomes empty and/or the network element is deactivated when the corresponding element target set becomes empty.

22. A method of supporting power control in a communication network, said network including a plurality of network elements that perform packet forwarding, each network element including one or more element ports, the method comprising:
  assigning a flow table to each of said network elements, said flow table including flow entries that specify via which element ports to forward packets the network element receives;
  deriving target sets from said flow tables, each of the target sets characterizing either a network element as a whole element target set or an individual element port as a port target set in terms of its utilization; and based on changes in the respective target sets, determining enforcement of power states on said network elements and/or said element ports, wherein a centralized power control is provided that, upon relevant changes of the port target set and/or the element target set, initiates activation/deactivation of the corresponding element port and/or network element, and wherein said centralized power control calculates a routing path, identifies network elements on said routing path, and stores a local copy of the flow tables of each of said network elements.

23. The method according to claim 22, wherein said centralized power control calculates changes in said flow tables that need to be applied to establish said routing path, and selects the network elements and the element ports for which the element target set and port target set, respectively, have become non-empty.

24. The method according to claim 22, wherein said centralized power control contacts each selected network element and selected element port to initiate start-up.

* * * * *